United States Patent
Trivelpiece et al.

(10) Patent No.: US 10,134,253 B2
(45) Date of Patent: Nov. 20, 2018

(54) SYSTEMS AND METHODS FOR LOCATING AND DETERMINING THE ORIENTATION OF A HANDHELD DEVICE

(71) Applicants: Steve E. Trivelpiece, Rancho Santa Margarita, CA (US); Alister Hosseini, Long Beach, CA (US); Richard J. Campero, Gilroy, CA (US); Craig E. Trivelpiece, Mission Viejo, CA (US)

(72) Inventors: Steve E. Trivelpiece, Rancho Santa Margarita, CA (US); Alister Hosseini, Long Beach, CA (US); Richard J. Campero, Gilroy, CA (US); Craig E. Trivelpiece, Mission Viejo, CA (US)

(73) Assignee: Tyco Fire & Security GmbH, Neuhausen Am Rheinfall (CH)

( * ) Notice: Subject to any disclaimer, the term of this patent is extended or adjusted under 35 U.S.C. 154(b) by 0 days.

(21) Appl. No.: 14/730,381

(22) Filed: Jun. 4, 2015

(65) Prior Publication Data
US 2016/0358440 A1   Dec. 8, 2016

(51) Int. Cl.
*G08B 13/14*   (2006.01)
*G08B 13/24*   (2006.01)
(Continued)

(52) U.S. Cl.
CPC ............ *G08B 13/2462* (2013.01); *G01S 5/14* (2013.01); *G01S 11/04* (2013.01); *G01S 11/06* (2013.01);
(Continued)

(58) Field of Classification Search
CPC ... G01S 5/06; G01S 13/75; G01S 1/68; G01S 5/0226; G01S 13/825; G01S 5/0018;
(Continued)

(56) References Cited

U.S. PATENT DOCUMENTS

| | | | |
|---|---|---|---|
| 6,249,252 B1 | 6/2001 | Dupray | |
| 6,529,164 B1 | 3/2003 | Carter | |

(Continued)

FOREIGN PATENT DOCUMENTS

| | | |
|---|---|---|
| CN | 102043149 A | 5/2011 |
| CN | 103279780 A | 9/2013 |

(Continued)

OTHER PUBLICATIONS

Wang, J. and Katabi, D., Dude, Wehre's My Card? RFID Positioning That Works with Multipath and Non-Line of Sight, Proceedings of the ACM SIGNCOMM 2013 conference, vol. 43, Issue 4, Oct. 2013, 51-62.

(Continued)

*Primary Examiner* — Firmin Backer
*Assistant Examiner* — Munear Akki
(74) *Attorney, Agent, or Firm* — Fox Rothschild LLP; Robert J. Sacco; Carol E. Thorstad-Forsyth

(57) ABSTRACT

Systems (100) and methods (400) for determining a Handheld Reader's ("HR") location within a facility. The methods involve: performing first operations by HR to read RFID tags having locations within the facility that are unknown to the handheld reader; performing second operations by HR to receive signals from RF Enabled Devices ("RFED") located at known locations within the facility; and determining HR's location/orientation using RSSI levels or TOF values of signals received from RFEDs, known locations of RFEDs, sensor data, known antenna patterns of RFEDs, a known antenna pattern of HR, and/or (9) information indicating which RFID tags were read by HR and at least one RFED. The first and second operations are performed while HR is being carried by a person throughout the facility.

16 Claims, 5 Drawing Sheets

(51) Int. Cl.
*G01S 5/14* (2006.01)
*G01S 11/04* (2006.01)
*G01S 11/06* (2006.01)
*G06K 7/00* (2006.01)
*G06K 19/07* (2006.01)
*G06Q 10/08* (2012.01)

(52) U.S. Cl.
CPC ....... G06K 7/0008 (2013.01); G06K 19/0723 (2013.01); G06Q 10/087 (2013.01)

(58) Field of Classification Search
CPC .............. G01S 5/0036; G06K 7/10316; G08B 13/2462; G08B 13/876; G01C 21/20
USPC .................................... 340/572.4, 10.1, 10.8
See application file for complete search history.

(56) References Cited

U.S. PATENT DOCUMENTS

| | | | |
|---|---|---|---|
| 7,005,968 B1* | 2/2006 | Bridgelall | G01S 13/876 340/10.42 |
| 7,151,979 B2 | 12/2006 | Andersen et al. | |
| 7,170,412 B2 | 1/2007 | Knox et al. | |
| 7,295,114 B1* | 11/2007 | Drzaic | A62B 99/00 235/385 |
| 7,312,752 B2 | 12/2007 | Smith et al. | |
| 7,456,726 B2 | 11/2008 | Hansen et al. | |
| 7,619,524 B2 | 11/2009 | Calvarese | |
| 7,667,575 B2 | 2/2010 | Husak et al. | |
| 7,772,976 B2 | 8/2010 | Christopher | |
| 8,002,181 B2 | 8/2011 | Ulrich et al. | |
| 8,072,311 B2 | 12/2011 | Sadr et al. | |
| 8,237,563 B2 | 8/2012 | Schatz et al. | |
| 8,427,281 B2 | 4/2013 | Tsujimoto et al. | |
| 8,459,540 B2 | 6/2013 | Brindley et al. | |
| 8,519,848 B2 | 8/2013 | Stern | |
| 8,629,773 B2 | 1/2014 | Rhie et al. | |
| 8,660,581 B2 | 2/2014 | Davis et al. | |
| 8,738,175 B2 | 5/2014 | Cameron et al. | |
| 9,195,866 B1* | 11/2015 | Mehranfar | G06Q 10/06 |
| 2004/0246926 A1* | 12/2004 | Belcea | G01S 5/0252 370/332 |
| 2006/0114104 A1 | 6/2006 | Scaramozzino | |
| 2006/0267731 A1 | 11/2006 | Chen | |
| 2008/0055088 A1 | 3/2008 | Fabre et al. | |
| 2008/0284593 A1* | 11/2008 | Soto | G08B 13/2471 340/541 |
| 2008/0296474 A1* | 12/2008 | Yamaguchi | G01S 17/026 250/206.1 |
| 2009/0101712 A1* | 4/2009 | Ulrich | G06Q 10/087 235/383 |
| 2009/0303047 A1* | 12/2009 | Rinkes | G06Q 10/08 340/572.1 |
| 2010/0007495 A1 | 1/2010 | Hanebeck | |
| 2010/0033306 A1* | 2/2010 | Bellows | H04Q 9/00 340/10.1 |
| 2010/0066503 A1* | 3/2010 | Rhie | G01S 1/68 340/10.1 |
| 2010/0201520 A1 | 8/2010 | Stern et al. | |
| 2011/0121075 A1 | 5/2011 | Bellows et al. | |
| 2011/0309931 A1* | 12/2011 | Rose | E21F 17/18 340/539.13 |
| 2012/0133488 A1 | 5/2012 | Choi et al. | |
| 2012/0268250 A1 | 10/2012 | Kaufman et al. | |
| 2012/0280812 A1* | 11/2012 | Sheikman | G01S 13/876 340/539.13 |
| 2013/0030931 A1* | 1/2013 | Moshfeghi | G01S 19/48 705/16 |
| 2013/0166193 A1 | 6/2013 | Goldman | |
| 2013/0169415 A1* | 7/2013 | Bellows | G06K 7/0008 340/10.1 |
| 2013/0249736 A1 | 9/2013 | Nikitin et al. | |
| 2014/0084060 A1 | 3/2014 | Jain et al. | |
| 2014/0124570 A1* | 5/2014 | Franklin | A61B 5/0015 235/375 |
| 2014/0148196 A1 | 5/2014 | Bassan-Eskenazi et al. | |
| 2014/0167918 A1 | 6/2014 | Stern | |
| 2014/0306808 A1* | 10/2014 | Jones | G06K 7/10356 340/10.4 |
| 2014/0375454 A1 | 12/2014 | Konrad et al. | |
| 2015/0061891 A1* | 3/2015 | Oleson | H04W 4/008 340/870.16 |
| 2015/0077245 A1 | 3/2015 | Kaufman et al. | |

FOREIGN PATENT DOCUMENTS

| | | |
|---|---|---|
| EP | 2341361 A1 | 7/2011 |
| JP | 2010226273 A | 10/2010 |
| KR | 20110098487 A | 9/2011 |
| WO | 200106401 A1 | 1/2001 |
| WO | 20080143483 A1 | 11/2008 |

OTHER PUBLICATIONS

Nemmaluri, Aditya et al., Sherlock: Automatically Locating Objects for Humans, Proceedings of the 6th International Conference on Mobile Systems, Applications, and Services, 2008, 187-198.
PCT International Search Report and Written Opinion of the International Searching Authority (EPO) for International Application No. PCT/US2016/033317 (dated Aug. 29, 2016).

* cited by examiner

SYSTEMS AND METHODS FOR LOCATING AND DETERMINING THE ORIENTATION OF A HANDHELD DEVICE

FIELD OF THE INVENTION

This document relates generally to wireless based systems. More particularly, this document relates to systems and methods for locating and/or determining the orientations of handheld devices within a facility using various technologies (e.g., Radio Frequency Identifier ("RFID") technology, proximity sensor technology, accelerometer technology, gyroscope technology, and/or photoelectric sensor technology).

BACKGROUND OF THE INVENTION

RFID technology has conventionally been used in the identification and tracking of products, equipment, and even people. For example, RFID systems are commonly used in Electronic Article Surveillance ("EAS") and in logistical and inventory systems for monitoring goods and equipment and recording information on the target item. An RFID system typically includes an RFID reader and an RFID device such as a tag or label. The RFID reader may transmit a Radio-Frequency ("RF") carrier signal to the RFID device. The RFID device may respond to the RF carrier signal (or interrogator signal) with a data response signal (or authentication reply signal) encoded with information stored on the RFID device. RFID devices may store information such as a unique identifier or an Electronic Product Code ("EPC") associated with an article or item.

The RFID technology allows retailers to rapidly and/or continuously identify products, count products and track product locations. As such, the RFID technology offers significant benefits over a physical inventory counting process. By leveraging the RFID technology to increase inventory accuracy, retailers are better able to perform replenishment, service customer requests, manage product recalls or any other activities that rely on inventory data. With this level of inventory visibility, retailers must also take on the additional burden of being able to locate specific products easily and quickly so that they can service the above-listed use cases. Products on the market today to aid in determining a product's location are either too expensive or not accurate enough to serve this need.

Indoor proximity systems are well known in the art. One conventional indoor proximity system is known as iBeacon®. iBeacon® employs Bluetooth communication technology to connect to mobile communication devices (e.g., cellular phones). Upon establishment of such connection, the iBeacon® requests and receives first information from each Mobile Communication Device ("MCD"). The first information includes information which has been agreed upon by the cell user for provision to the iBeacon®. The iBeacon® can also push second information to the MCD. The Bluetooth communication technology is based on a 2.45 GHz transmission, and its data rate ranges from 1 Mbit to 24 Mbit.

SUMMARY OF THE INVENTION

The present disclosure concerns implementing systems and methods for determining a location of a handheld RFID reader within a facility. The methods comprise: performing first operations by the handheld reader to read RFID tags having locations within the facility that are unknown to the handheld reader; performing second operations by the handheld reader to receive first signals from a plurality of RF enabled devices (e.g., fixed RFID readers, RF beacons and/or RFID tags) located at known locations within the facility; determining an orientation of the handheld reader and a location of the handheld reader within the facility using the first signals; and/or generating a multi-dimensional map that shows the location of the handheld reader within the facility and/or the orientation of the handheld reader. Notably, the first and second operations are performed while the handheld reader is being carried by a person throughout the facility.

The handheld readers orientation and location is determined using a combination of at least two of: (1) Received Signal Strength Indicator ("RSSI") levels of the first signals; (2) known locations of the RF enabled devices associated with the RSSI levels; (3) Time-Of-Flight ("TOF") values computed for the first signals; (4) known locations of the RF enabled devices associated with the TOF values; (5) sensor data generated by first sensors disposed in the handheld reader (e.g., accelerometers, gyroscopes and compasses); (6) sensor data generated by second sensors disposed at known locations within the facility (e.g., photoelectric sensors); (7) known antenna patterns of the RF enabled devices; (8) a known antenna pattern of the handheld reader; and (9) information indicating which RFID tags were read by the handheld reader and at least one of the RF enabled devices.

In some scenarios, the second operations are performed by the handheld reader. Alternatively or additionally, the second operations can be performed by a remotely located computing device (e.g., a server located in the facility or in another facility). The first signals respectively comprise unique identifiers for the RF enabled devices. The location of the handheld reader is determined using triangulation. The first signals are sent from the RF enabled devices at different times or frequencies. The location of the handheld reader is used to determine a relative location of at least one RFID tag within the facility.

DESCRIPTION OF THE DRAWINGS

Embodiments will be described with reference to the following drawing figures, in which like numerals represent like items throughout the figures, and in which.

DETAILED DESCRIPTION OF THE INVENTION

Figure 1:
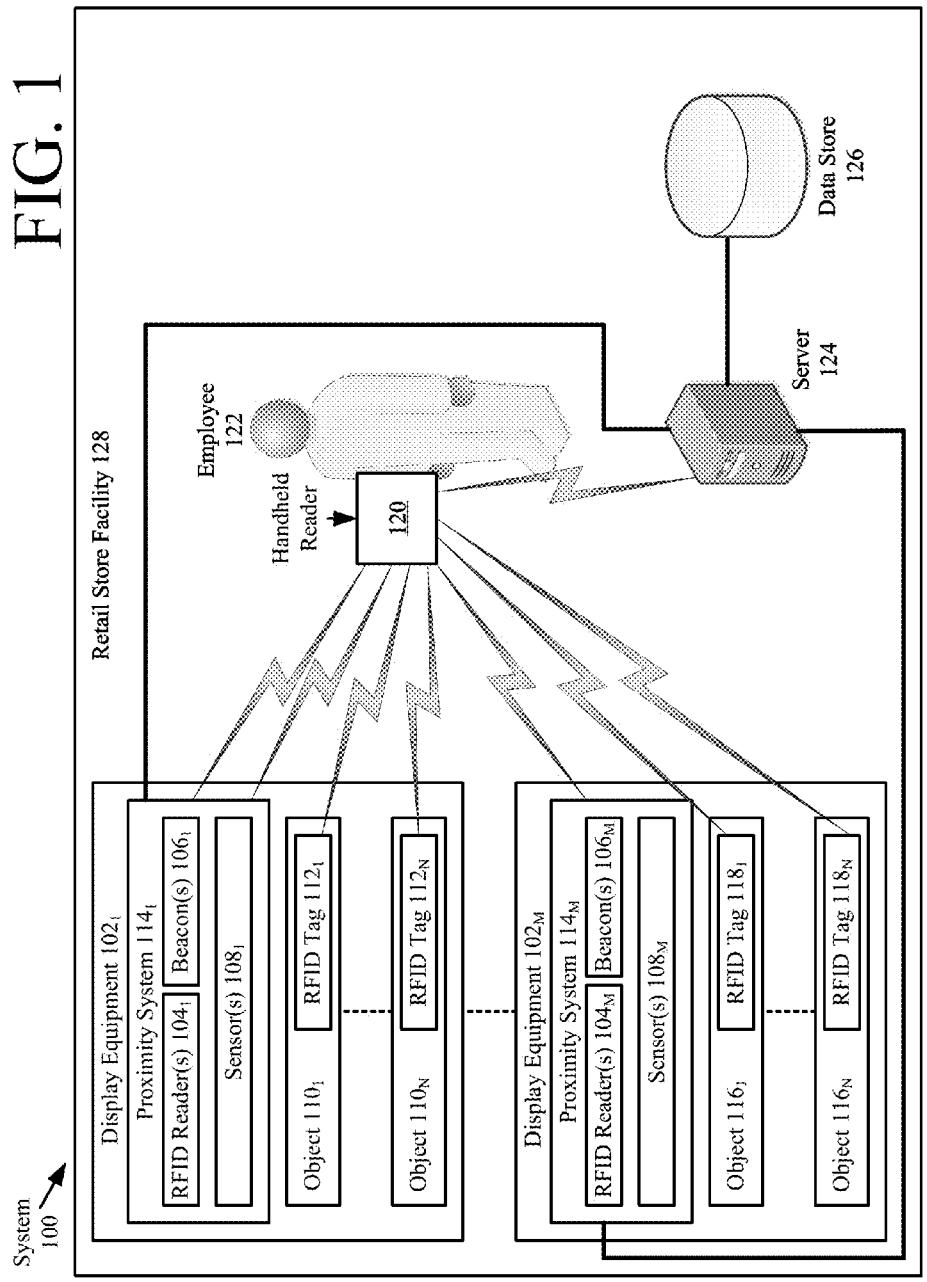
FIG. 1 is a schematic illustration of an exemplary system that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present disclosure concerns systems and methods for locating and determining the orientations of stationary objects (e.g., security tags) and/or moving objects (e.g., a handheld reader) within a facility using one or more different types of technology (e.g., RFID technology, proximity sensor technology, accelerometer technology, gyroscope technology, and/or photoelectric sensor technology). For example, in some scenarios, RFID readers, beacons (e.g., iBeacons®) and/or photoelectric sensors (e.g., beam break sensors) are strategically placed at certain locations (e.g., on shelves or other display equipment) within the facility. The RFID readers, beacons and/or photoelectric sensors collectively provide a means to determine highly accurate locations of the stationary and moving objects within the facility (e.g., a handheld reader and RFID tags). For example, stationary security tags that are read by a fixed RFID reader are considered as being located within a known area of the facility (e.g., within a 30 foot range of the fixed RFID reader). However, this knowledge does not provide an accurate enough location of the security tags for certain applications. As such, additional operations are performed to increase the accuracy of the security tag's locations. Therefore once these relatively inaccurate locations of the security tags are obtained, additional information can be used to obtain a more accurate determination of the security tag's locations within the facility. Also, operations are performed to determine an accurate location of the handheld reader while it is being used to read the security tags. In this regard, a location of a handheld reader can be determined relative to other RF enabled devices having known locations within the facility (e.g., using results of Received Signal Strength Indicators ("RSSIs") computations and/or Time-Of-Flight ("TOF") computations). Thereafter, a three dimensional map is generated showing the location of the handheld reader and/or the locations of the security tags relative to the handheld reader in three dimensional space. The orientation of the handheld reader can also be determined and shown on the three dimensional map.

This location/orientation information is useful for many purposes. For example, the location/orientation information can be used to monitor where a store employee travels to/from within the facility to verify that the store employee correctly covered the entire facility. Alternatively or additionally, this location/orientation information can be used to continuously track movement of a person within the facility, such as a firefighter. In this case, an RFID reader can be placed on the firefighter's backpack to facilitate communication with security tags and other RFID enabled devices having known locations within a three dimensional space.

The basic idea of this disclosure can be easily understood in a small retail store context. Let's assume that eight fixed RFID readers are placed around the walls of the retail store. Each RFID reader reads RFID tags that are within a semi-sphere range therefrom. Each RFID reader sends an RF signal with an identifier that can be read at one hundred feet therefrom. A handheld reader reads the identifiers of the fixed RFID readers, and independently determines RSSI levels of each fixed RFID reader. If the handheld reader receives RF signals from a plurality of fixed RFID readers, then a conclusion can be made that the handheld reader is pointing in a direction towards those fixed RFID readers. The RSSI levels can be used to determine a more accurate location and/or orientation of the handheld reader within the facility. Next, if the handheld reader reads the RFID tags that are in the Field-Of-View ("FOV") of one of the fixed RFID readers, then a conclusion can be made that the handheld reader is pointing in a direction towards that fixed RFID reader's semi-sphere antenna pattern. The more RFID tags read by the handheld reader, the more information is obtained to determine how far the handheld reader is from a fixed RFID reader and/or tag. The handheld reader can vary its RFID read power and use an averaging technique to improve its location determination. Once the handheld's location has been determined, then an accelerometer, gyroscope and/or compass is used to track changes from the current location of the handheld reader. On a continuous or periodic basis, data received from the RFID readers and/or tags is re-analyzed to update the location and/or orientation determination for the handheld reader. Alternatively or additionally, information received from RFID beacons can be used to determine the location of the handheld reader within the facility. This could be done using a TOF analysis of signals sent from the RFID beacons.

Notably, communications to/from the RFID enabled devices can be synchronized with each other so as to minimize or eliminate interference therebetween. Various synchronization schemes are known in the art (e.g., time division multiplexing and frequency division multiplexing), and therefore will not be described herein. Any known or to be known synchronization technique can be used herein in accordance with the parameters of a particular application.

Exemplary Systems

Referring now to FIG. 1, there is provided a schematic illustration of an exemplary system 100 that is useful for understanding the present invention. The present invention is described herein in relation to a retail store environment. The present invention is not limited in this regard, and can be used in other environments. For example, the present invention can be used in distribution centers, factories and other commercial environments. Notably, the present invention can be employed in any environment in which electronic devices and/or objects need to be located and/or tracked.

The system 100 is generally configured to allow improved device and/or object locating within a facility using various types of communication and sensor technologies. As shown in FIG. 1, system 100 comprises a Retail Store Facility ("RSF") 128 in which display equipment 104, 106 is disposed. The display equipment is provided for displaying objects $110_1$-$110_N$, $116_1$-$116_N$ to customers of the retail store. The display equipment can include, but is not limited to, shelves, article display cabinets, promotional displays, fixtures and/or equipment securing areas of the RSF 128. The RSF can also include emergency equipment (not shown), checkout counters and an EAS system (not shown). Emergency equipment, checkout counters, and EAS systems are well known in the art, and therefore will not be described herein.

Proximity systems $114_1$, ..., $114_M$ are located at strategic locations within the RSF 102. In some scenarios, the proximity systems are disposed on display equipment 104 and 106, as shown in FIG. 1. Additionally or alternatively, the proximity systems $114_1$, ..., $114_M$ are disposed on emergency equipment, checkout counters and/or EAS system equipment (e.g., pedestals near and entrance/exit of the RSF). The proximity systems are generally configured to facilitate a periodic or continuous determination of an accurate location and orientation of the handheld reader 120 being carried by an employee 122 through the RSF 128. The handheld reader 120 will be described in detail below in relation to FIG. 3. Still, it should be understood that the handheld reader 120 is generally configured to read RFID tags $112_1$, ..., $112_N$, $118_1$, ..., $118_N$.

The RFID tags $112_1$-$112_N$, $118_1$-$118_N$ are respectively coupled to the objects $110_1$-$110_N$, $116_1$-$116_N$. The RFID tags are described herein as comprising single-technology tags that are only RFID enabled. The present invention is not limited in this regard. The RFID tags can alternatively or additionally comprise dual-technology tags that have both EAS and RFID capabilities.

Each proximity system $114_1$, ..., $114_M$ comprises at least one RFID reader $104_1$, ..., $104_M$. RFID readers are well known in the art, and therefore will not be described herein. Still, it should be understood that the RFID readers are generally configured to read the RFID tags $112_1$, ..., $112_N$, $118_1$, ..., $118_N$. The RFID readers have known omnidirectional or directional antenna patterns, and are arranged such that their antenna patterns do or do not overlap with each other. Information is stored in a data store 126 that specifies the known locations of the RFID readers in three dimensional space. This information can be stored in the a memory internal to the handheld reader and/or in a remote data store 126 using a server 124. Server 124 will be described in more detail below in relation to FIG. 2.

After the RFID readers have been placed within the RSF, operations can be performed to determine the locations of the RFID tags relative thereto. In this regard, the RFID readers read the RFID tags, and communicate information to the data store 126 for storage therein. This information can include, but is not limited to, first unique identifiers of the RFID readers, second unique identifiers of RFID tags that were read by the RFID readers, and/or timestamps reflecting the times at the RFID tag reads. Each second unique identifier is stored in the data store 126 so as to be associated with the first unique identifier corresponding to the RFID reader that read the corresponding RFID tag. This information is then used to determine the locations of the RFID readers in three dimensional space. A three dimensional map can be generated showing the locations of the RFID readers and/or RFID tags in the three dimensional space. Notably, the RFID tag locations are relatively inaccurate at this point in time since all that is known is that the RFID tags reside within a FOV of the RFID readers, respectively. As such, further operations are performed to increase the accuracy of the RFID tag locations as will be described below.

The fixed RFID readers are also used to determine the location of the handheld reader 120 as it is being carried through the RSF 128 by the employee 122. This determination can be made based on RSSI computations as described below in relation to FIG. 4. RSSI computations are well known in the art, and therefore will not be described herein. Any known or to be known RSSI computation can be used herein without limitation.

RF beacons $106_1$, ..., $106_M$ may also optionally be included with the proximity systems $114_1$, ..., $114_M$. RF beacons are well known in the art, and therefore will not be described herein. The RF beacons are generally configured to communicate with the handheld reader 120 to facilitate the determination as to where the handheld reader 120 is within the RSF 128 at any given time. This determination can be made based on TOF computations, as described below in relation to FIG. 4. TOF computations are well known in the art, and therefore will not be described herein. Any known or to be known TOF computation can be used herein without limitation.

Sensors $108_1$, ..., $108_M$ may optionally be included with the proximity systems $114_1$, ..., $114_M$. The sensors can include, but are not limited to, photoelectric sensors (e.g., beam break sensors) or other people counter sensing devices. These sensors can be used to determine a location of the employee 122 within the RSF to a relatively high degree of accuracy. Once the employee's location is known, various techniques can be employed using this start location to continuously or periodically determine the handheld reader's location as it is being carried through the facility by the employee.

Figure 2:
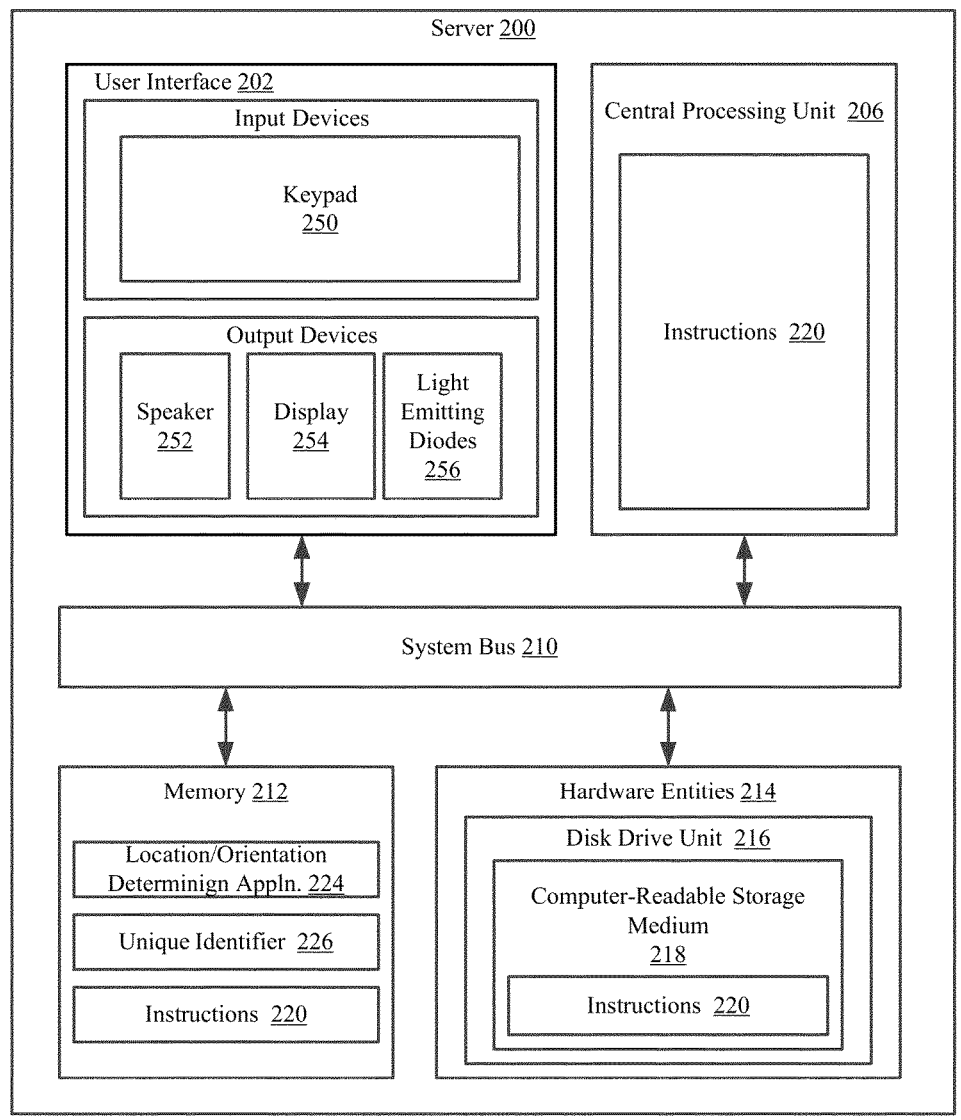
FIG. 2 is a block diagram of an exemplary architecture for a server.

Referring now to FIG. 2, there is provided a detailed block diagram of an exemplary architecture for a server 200. Server 124 of FIG. 1 is the same as or substantially similar to server 200. As such, the following discussion of server 200 is sufficient for understanding server 124.

Notably, the server 200 may include more or less components than those shown in FIG. 2. However, the components shown are sufficient to disclose an illustrative embodiment implementing the present invention. The hardware architecture of FIG. 2 represents one embodiment of a representative server configured to facilitate the provision of a three dimensional map showing highly accurate locations of RFID tags (e.g., RFID tags $112_1$, ..., $112_N$, $118_1$, ..., $118_N$ of FIG. 1) and/or a handheld reader within an RSF (e.g., RSF 128 of FIG. 1). As such, the server 200 of FIG.

2 implements at least a portion of a method for providing such accurate locations in accordance with embodiments of the present invention. Some or all of the components of the server 200 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 2, the server 200 comprises a user interface 202, a Central Processing Unit ("CPU") 206, a system bus 210, a memory 212 connected to and accessible by other portions of server 200 through system bus 210, and hardware entities 214 connected to system bus 210. The user interface can include input devices (e.g., a keypad 250) and output devices (e.g., speaker 252, a display 254, and/or light emitting diodes 256), which facilitate user-software interactions for controlling operations of the server 200.

At least some of the hardware entities 214 perform actions involving access to and use of memory 212, which can be a Random Access Memory ("RAM"), a disk driver and/or a Compact Disc Read Only Memory ("CD-ROM"). Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the server 200. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 220 for execution by the server 200 and that cause the server 200 to perform any one or more of the methodologies of the present disclosure.

In some embodiments of the present invention, the hardware entities 214 include an electronic circuit (e.g., a processor) programmed for facilitating the provision of a three dimensional map showing accurate locations of RFID tags and/or a handheld reader within a facility. In this regard, it should be understood that the electronic circuit can access and run a retail software application 224 installed on the server 200. The software application 224 is generally operative to facilitate: the determination of RFID tag locations within a facility; mapping of the RFID tag locations in a virtual three dimensional space; the determination of a handheld reader's location within the facility; mapping of the handheld reader's location in the virtual three dimensional space; the determination of the handheld reader's orientation; and/or the inclusion of an indication on the three dimensional map specifying the handheld reader's orientation. The map data can be processed by the server 200 and/or the external device to evaluate the relative locations of the handheld reader and the security tags. Other functions of the software application 224 will become apparent as the discussion progresses.

Figure 3:
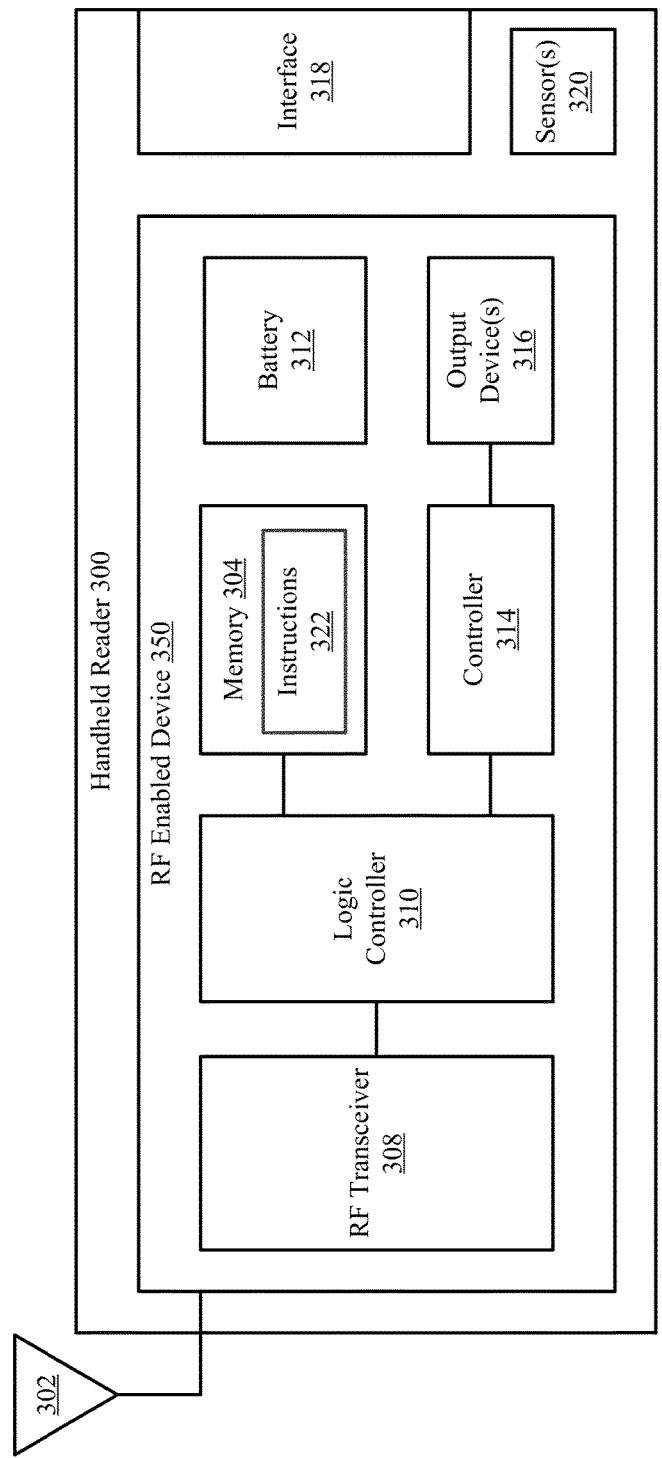
FIG. 3 is a block diagram of an exemplary architecture for a handheld reader.

Referring now to FIG. 3, there is provided a detailed block diagram of an exemplary architecture for a handheld reader 300. Handheld reader 120 of FIG. 1 is the same as or similar to handheld reader 300. As such, the discussion of handheld reader 300 is sufficient for understanding handheld reader 120.

Handheld reader 300 may include more or less components that that shown in FIG. 3. However, the components shown are sufficient to disclose an illustrative embodiment implementing the present invention. Some or all of the components of the handheld reader 300 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 3 represents an embodiment of a representative handheld reader 300 configured to facilitate improved object locating within an RSF (e.g., RSF 128 of FIG. 1). In this regard, the handheld reader 300 comprises an RF enabled device 300 for allowing data to be exchanged with an external device (e.g., RFID readers $104_1, \ldots, 104_M$, RF beacons $106_1, \ldots, 106_M$, sensors $108_1, \ldots, 108_M$, and/or RFID tags $112_1, \ldots, 112_N$, $118_1, \ldots, 118_N$ of FIG. 1) via RF technology. The components 304-316 shown in FIG. 3 may be collectively referred to herein as the RF enabled device 350, and include a power source 312 (e.g., a battery).

The RF enabled device 350 comprises an antenna 302 for allowing data to be exchanged with the external device via RF technology (e.g., RFID technology or other RF based technology). The external device may comprise RFID readers $104_1, \ldots, 104_M$, RFID beacons $106_1, \ldots, 106_M$, sensors $108_1, \ldots, 108_M$, and/or RFID tags $112_1, \ldots, 112_N$, $118_1, \ldots, 118_N$ of FIG. 1. In this case, the antenna 302 is configured to transmit RF carrier signals (e.g., interrogation signals) to the listed external devices, and/or transmit data response signals (e.g., authentication reply signals) generated by the RF enabled device 350. In this regard, the RF enabled device 350 comprises an RF transceiver 308. RFID transceivers are well known in the art, and therefore will not be described herein. However, it should be understood that the RF transceiver 308 receives RF signals including information from the transmitting device, and forwards the same to a logic controller 310 for extracting the information therefrom.

The extracted information can be used to determine the location of the handheld reader 300 within a facility (e.g., RSF 128 of FIG. 1) with a relatively high degree of accuracy. Accordingly, the logic controller 310 can store the extracted information in memory 304, and execute algorithms using the extracted information. For example, the logic controller 310 can perform RSSI algorithms and TOF algorithms to determine the location of the handheld reader 300 relative to external devices with known locations within the facility.

Notably, memory 304 may be a volatile memory and/or a non-volatile memory. For example, the memory 304 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 204 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Instructions 322 are stored in memory for execution by the RF enabled device 350 and that cause the RF enabled device 350 to perform any one or more of the methodologies of the present disclosure. The instructions 322 are generally operative to facilitate: the determination of RFID tag locations within a facility; mapping of the RFID tag locations in a virtual three dimensional space; the determination of a handheld reader's location within the facility; and/or mapping of the handheld reader's location in the virtual three dimensional space. The map data can be processed by the RF enabled device 350 and/or an external device (e.g., server 124 of FIG. 1) to evaluate (1) the relative locations of the handheld reader and the security tags and/or (2) the relative locations of the handheld reader and other RF enabled devices (e.g., RFID readers and/or RF beacons of FIG. 1). Other functions of the RF enabled device 350 will become apparent as the discussion progresses.

Exemplary Methods for Locating an RF Enabled-Device in a Facility

Referring now to FIG. 4, there is provided a flow diagram of an exemplary method 400 for locating an RF enabled device (e.g., handheld reader 120 and/or RFID tags $112_1, \ldots, 112_N, 118_1, \ldots, 118_N$ of FIG. 1) within a facility (e.g., RSF 128 of FIG. 1). Method 400 begins with step 402 and continues with step 404. In step 404, a plurality of proximity systems (e.g., proximity systems $114_1, \ldots, 114_M$ of FIG. 1) are strategically placed around a facility (e.g., RSF 128 of FIG. 1). In some scenarios, the proximity systems are disposed on display equipment (e.g., display equipment $102_1, \ldots, 102_M$ of FIG. 1), emergency equipment, checkout counters and/or EAS system equipment. Notably, each proximity system comprises at least one RF enabled device (e.g., an RFID reader $104_1, \ldots, 104_M$, a beacon $106_1, \ldots, 106_M$, and/or a sensor $108_1, \ldots, 108_M$ of FIG. 1) with a known omnidirectional or directional antenna pattern. The RF enabled devices can be arranged such that their antenna patterns do or do not overlap.

Once the proximity systems have been placed in the facility, information is collected that specifies their known locations and/or antenna patterns, as shown by step 404. This information is stored in a data store (e.g., data store 126 of FIG. 1). Also in a next step 406, the RF enabled devices of the proximity system (e.g., the RFID readers) perform operations to respectively read a plurality of RFID tags (e.g., RFID tags $112_1, \ldots, 112_N, 118_1, \ldots, 118_N$ of FIG. 1) within the facility. Unique identifiers of the RF enabled devices and RFID tags are stored in a data store so as to be associated with each other, as shown by step 408. Time stamps are also respectively stored with the unique identifiers. The time stamps indicate the times at which the RFID tags were read by the RF enabled devices. This information is sufficient for determining the locations of the RFID tags within an FOV of the RF enabled devices. For example, if it is known that each RF enabled device has a known FOV, then this information indicates which RFID tags are located within a known range from the RF enabled devices, respectively.

Sometime thereafter step 410 is performed where a handheld reader (e.g., handheld reader 120 of FIG. 1) is carried around the facility (e.g., by an employee 122 of FIG. 1). During this time, the handheld reader performs operations in step 412 to read the plurality of RFID tags. The RFID tags are attached to objects (e.g., objects $110_1, \ldots, 110_N$, $116_1, \ldots, 116_N$ of FIG. 1) located within the facility. As a result of the read operations, the handheld reader obtains unique identifiers of the RFID tags that were read thereby. The unique identifiers and/or time stamp information is stored in an internal memory of the handheld reader (e.g., memory 304 of FIG. 1) and/or an external data store (e.g., data store 126 of FIG. 1) for later use. The time stamp information specifies that time(s) that the reads occurred.

Notably, at this time, accurate locations of the handheld reader and RFID tags within the facility are unknown. All that is known is that certain RFID tags were read by the handheld reader. Therefore, method 400 continues with steps 416-436 which generally implement a process for accurately determining the locations of the handheld reader and/or RFID tags in the facility.

Figure 4A:
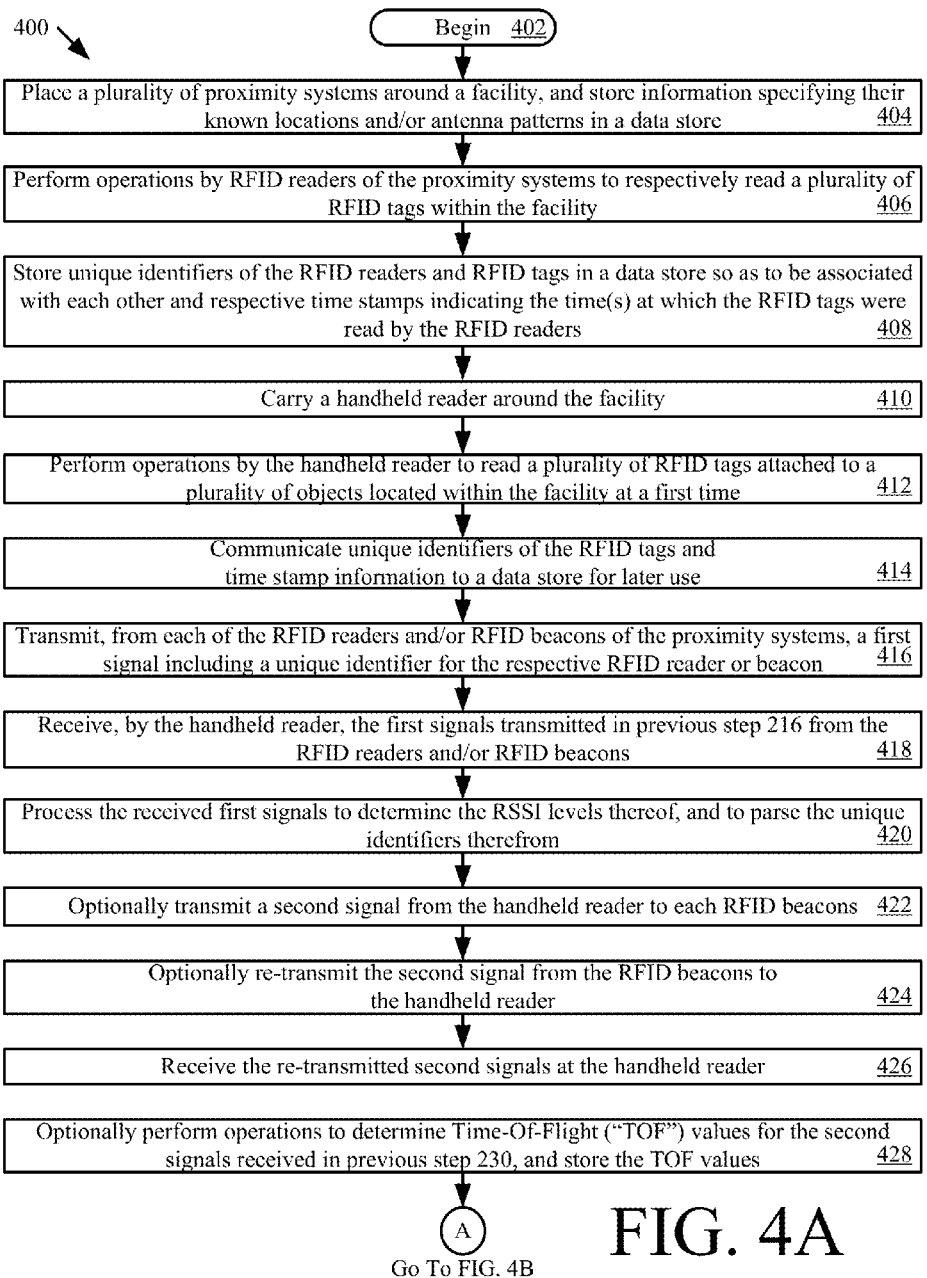
FIGS. 4A-4B (collectively referred to herein as "FIG. 4") provide a flow diagram of an exemplary method for determining a location and/or orientation of a handheld reader within a facility.

Steps 416-420 of FIG. 4A involve performing RSSI based operations. These operations include: transmitting, from each of the RFID readers and/or RFID beacons of the proximity systems, a first signal including a unique identifier for the respective RFID reader or beacon; receiving, by the handheld reader, the first signals transmitted from the RFID readers and/or RFID beacons; and processing the received first signals to determine the RSSI levels thereof and parse the unique identifiers therefrom. The RSSI levels and unique identifiers can be stored in an internal memory of the handheld reader (e.g., memory 304 of FIG. 1) and/or an external data store (e.g., data store 126 of FIG. 1) for later use. Time stamp information can also be stored along with the RSSI levels and unique identifiers.

Steps 422-428 of FIG. 4A involve performing optional TOF operations. These operations include: transmitting a second signal from the handheld reader to each RFID beacon; re-transmitting the second signal from the RFID beacons to the handheld reader; and determining TOF values for the second signals received at the handheld reader. The TOF values and unique identifiers of the RFID beacons can be stored in an internal memory of the handheld reader (e.g., memory 304 of FIG. 1) and/or an external data store (e.g., data store 126 of FIG. 1) for later use. Time stamp information can also be stored along with the TOF values and unique identifiers. Notably, steps 422-428 can be performed at the same time or at a different time as steps 416-420.

Figure 4B:
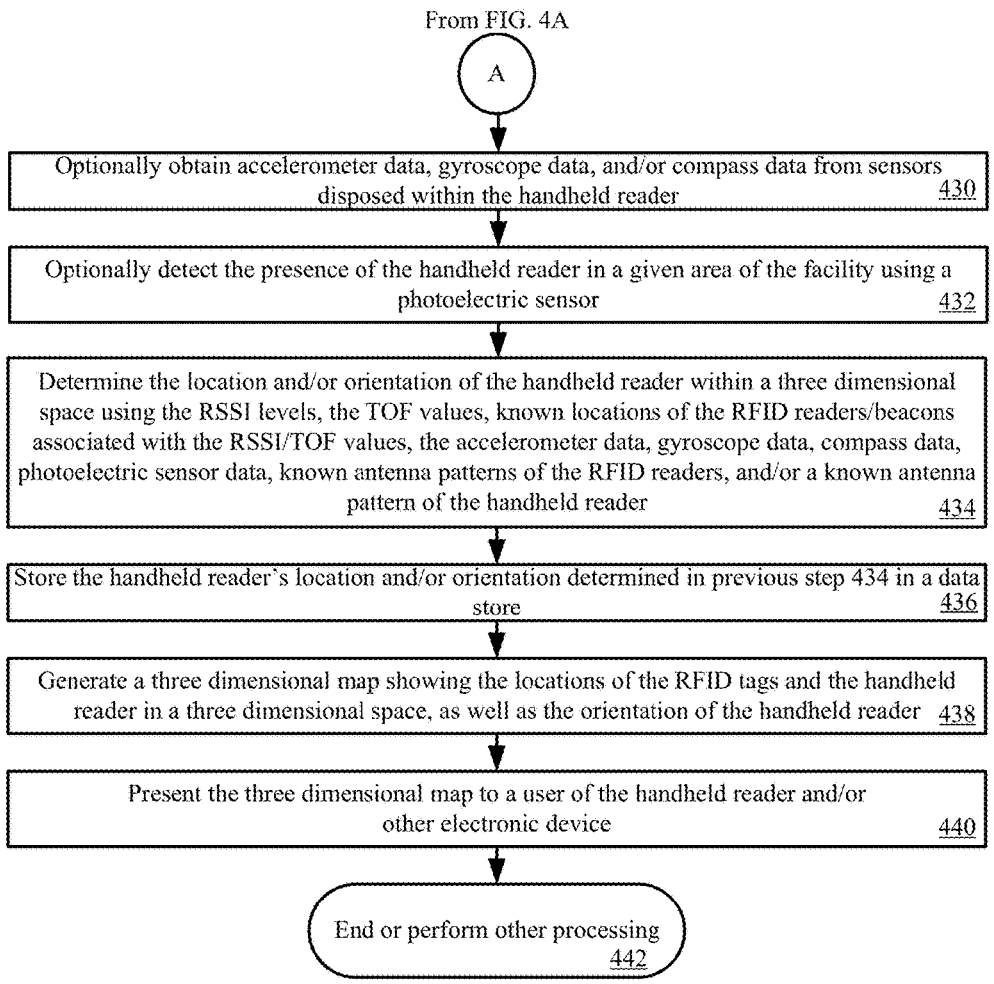

Optional steps 430-432 of FIG. 4B involve: obtaining accelerometer data, gyroscope data, and/or compass data from sensors disposed within the handheld reader (e.g., sensors 320 of FIG. 3); and detecting the presence of the handheld reader in a given area of the facility using a photoelectric sensor (e.g., beam break sensor). This sensor information is useful for determining an accurate location and/or orientation of the handheld reader.

Therefore, next step 434 involves determining the location and/or orientation of the handheld reader within a three dimensional space using the RSSI levels, the TOF values, known locations of the RFID readers and/or RFID beacons associated with the RSSI/TOF values, the accelerometer data, the gyroscope data, the compass data, the photoelectric sensor data, known antenna patterns of the RFID readers, and/or a known antenna pattern of the handheld reader. This determination can be made by the handheld reader and/or an external device (e.g., server 124 of FIG. 1). The determined location and/or orientation of the handheld reader is then stored in an internal memory of the handheld reader (e.g., memory 304 of FIG. 1) and/or an external data store (e.g., data store 126 of FIG. 1) for later use, as shown by step 436.

In some scenarios, step 434 involves triangulating the handheld reader's location using the RSSI levels and known locations of the fixed RFID readers/beacons of the proximity systems. Notably, communications to/from the RFID readers/beacons can be synchronized so as to minimize or eliminate interference therebetween. For example, the RFID readers/beacons are designed to implement time division multiplexing, frequency division multiplexing, or any other suitable synchronization technique. The handheld reader's transmit and receive operations would be synchronized as well. In some cases, the handheld reader would know from which RFID reader/beacon it received an RF signal based on the time slot or channel the RF signal was transmitted in/on. As such, the RFID readers/beacons would not need to transmit their unique identifiers to the handheld reader in this case.

As noted above, the RSSI and TOF operations (i.e., steps 422-428 and 416-420) can be performed in parallel. As such, both the RSSI levels and TOF values can be used in step 434 to accurately determine the handheld reader's location in the facility and the handheld reader's orientation in a three dimensional space. A more accurate determination of the handheld reader's orientation can be obtained using the accelerometer data, the gyroscope data, and/or the compass data.

In those or other scenarios, the RSSI levels and/or TOF values are used to determine the relative location of the handheld reader to each RFID reader/beacon. Alternatively or additionally, unique identifiers and the known locations of the RFID readers/beacons/tags can be used to determine an accurate location of the handheld reader in the facility and/or which direction the handheld reader is pointing.

In step 438, a three dimensional map is generated. The three dimensional map shows the locations of the RFID tags and/or the handheld reader in a three dimensional space. The orientation of the handheld reader can also be shown in the three dimensional map. The three dimensional map can be generated by the handheld reader and/or other device (e.g., server 124 of FIG. 1). The three dimensional map is then presented to a user of the handheld reader and/or other electronic device, as shown by step 440. Next, step 442 is performed where method 400 ends or other processing is performed.

In view of the forgoing, a number of techniques are described for accurately determining a handheld reader's location and orientation. One such technique involves transmitting identifiers from each of a plurality of fixed RFID readers. The fixed RFID readers can use RFID protocols to send the unique identifiers. The handheld reader would transition into a power reading mode in response to its reception of the unique identifiers from the fixed RFID readers. In this power reading mode, the handheld reader would determine the RSSI levels of the signals received from the fixed RFID readers, as well as parse the unique identifiers from the signals. The handheld reader then performs triangulation operations using the RSSI levels and known fixed locations of the fixed RFID readers. The triangulation operations are performed to determine the handheld reader's location in the facility with a relatively high degree of accuracy.

In the triangulation scenarios, the transceiver operations of the fixed RFID readers and handheld reader may be synchronized in accordance with a time division mode. As such, the handheld reader would look for signals from the fixed RFID readers during respective fixed time intervals (or time slots). If the handheld reader received an RFID transmission during a predetermined time slot, then the handheld reader would know which fixed RFID reader transmitted the RFID transmission. After finding the RSSI of several fixed RFID readers, the handheld reader can triangulate its location.

A second technique involves modifying a handheld reader such that it can receive signals from RFID beacons and perform TOF determinations on received signals. This can be achieved by including data in the transmissions or by synchronizing all of the devices in the area. Using this data, the handheld reader could determine its location and in which direction it is pointing. This technique can be used independently from the above mention RSSI based technique or in parallel therewith. If used in parallel, then software can be used to take advantage of both pieces of information (i.e., RSSI and TOF information) and very accurately determine the location of the handheld reader and its orientation in space.

A third technique involves adding accelerometers, gyroscope and/or compasses to the handheld reader. In this case, the handheld reader can determine its orientation and direction in space with a higher degree of accuracy.

A fourth technique employs RFID beacons that use RF signals such as Bluetooth protocols. The handheld reader measures the signal strength from each Bluetooth device in range to approximate its location from each RFID beacon. In addition, the handled reader can send a signal (e.g., a command signal) to each respective RFID beacon. The RFID beacons would in turn send the command response back to the handheld reader as quickly as possible. The handheld reader could then use the TOF information and optionally the signal strength to determine the location from each RFID beacon within RF communications range.

A fifth technique involves time synchronizing the RFID beacons to each other and the handheld reader. During specific time intervals, the RFID beacons transmit a command to the handheld reader. The handheld reader determines the time it took for the command to be received. Based on the time interval, the handheld reader determines the distance to each RFID beacon based on the TOF calculations. The time synchronization could be through an external means. Alternatively, the handheld reader can send the time synchronization intervals.

A sixth technique involves placing RFID tags at fixed locations within the facility. The handheld reader reads these RFID tags. Since the handheld reader knows where the RFID tags are physically located within the store, the handheld reader can use this information to determine where it is pointing and where it is in the store.

Also people counters or infrared beam-breaks can be used to determine the exact location of the handheld device while breaking the beam and reading some RFID tags. This information (combined with information obtained from the accelerometers, gyroscopes, and compasses inside the handheld device (determining the position/direction of the handheld antenna radiation beam) along with radiated beam-pattern information of the antenna (e.g. gain, beam width, etc.) used in the handheld device) can be used to locate the tag more accurately in the environment.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for determining a location of a handheld reader within a facility, comprising: performing first operations by the handheld reader to read Radio Frequency Identifier ("RFID") tags having locations within the facility that are unknown to the handheld reader; performing second operations by the handheld reader to receive first signals from a plurality of stationary Radio Frequency ("RF") enabled devices located at known locations within the facility; determining at least one of an orientation of the handheld reader and a location of the handheld reader within the facility using a combination of at least two of (1) Received Signal Strength Indicator ("RSSI") levels of the first signals, (2) known locations of the RF enabled devices associated with Time Of Flight ("TOF") values, and (3) information indicating which RFID tags were read by the handheld reader and at least one of the RF enabled devices; and generating a multi-dimensional map showing the location of the handheld reader within the facility and the orientation of the handheld reader; wherein the first and second operations are performed while the handheld reader is being carried by a person throughout the facility.

2. The method according to claim 1, wherein the first signals respectively comprise unique identifiers for the RF enabled devices.

3. The method according to claim 1, wherein the RF enabled devices comprise RFID readers, beacons or RFID tags.

4. The method according to claim 1, wherein the location of the handheld reader is determined using triangulation.

5. The method according to claim 1, wherein the orientation or location of the handheld reader is further determined based on at least one of sensor data generated by people detection sensors disposed at known locations in the facility, Time-Of-Flight ("TOF") values computed for the first signals, known locations of the RF enabled devices associated with the TOF values, sensor data generated by first sensors disposed in the handheld reader, sensor data generated by second sensors disposed at known locations within the facility, known antenna patterns of the RF enabled devices, and a known antenna pattern of the handheld reader.

6. The method according to claim 1, wherein the first signals are sent from the RF enabled devices at different times or frequencies.

7. The method according to claim 1, further comprising determining a location of at least one RFID tag within the facility relative to the location of the handheld reader which was previously determined.

8. A handheld reader, comprising: an electronic circuit configured to perform first operations to read Radio Frequency Identifier ("RFID") tags having locations within the facility that are unknown to the handheld reader, perform second operations to receive first signals from a plurality of stationary Radio Frequency ("RF") enabled devices located at known locations within the facility, and determine at least one of an orientation of the handheld reader and a location of the handheld reader within the facility using a combination of at least two of (1) Received Signal Strength Indicator ("RSSI") levels of the first signals, (2) known locations of the RF enabled devices associated with Time Of Flight ("TOF") values, and (3) information indicating which RFID tags were read by the handheld reader and at least one of the RF enabled devices; and generate a multi-dimensional map showing the location of the handheld reader within the facility and the orientation of the handheld reader; wherein the first and second operations are performed while the handheld reader is being carried by a person throughout the facility.

9. A system, comprising: a plurality of stationary Radio Frequency ("RF") enabled devices located at known locations within the facility; a handheld reader performing first operations to read Radio Frequency Identifier ("RFID") tags having locations within the facility that are unknown to the handheld reader, and second operations to receive first signals from a plurality of stationary Radio Frequency ("RF") enabled devices located at known locations within the facility; and a computing device configured to determine an orientation of the handheld reader and a location of the handheld reader within the facility using a combination of at least two of (1) Received Signal Strength Indicator ("RSSI") levels of the first signals, (2) known locations of the RF enabled devices associated with Time Of Flight ("TOF") values, and (3) information indicating which RFID tags were read by the handheld reader and at least one of the RF enabled devices; and generate a multi-dimensional map showing the location of the handheld reader within the facility and the orientation of the handheld reader; wherein the first and second operations are performed while the handheld reader is being carried by a person throughout the facility.

10. The system according to claim 9, wherein the first signals respectively comprise unique identifiers for the RF enabled devices.

11. The system according to claim 9, wherein the RF enabled devices comprise RFID readers, beacons or RFID tags.

12. The system according to claim 9, wherein the location of the handheld reader is determined using triangulation.

13. The system according to claim 9, wherein the orientation or location of the handheld reader is further determined based on at least one of sensor data generated by people detection sensors, Time-Of-Flight ("TOF") values computed for the first signals, known locations of the RF enabled devices associated with the TOF values, sensor data generated by first sensors disposed in the handheld reader, sensor data generated by second sensors disposed at known locations within the facility, known antenna patterns of the RF enabled devices, and a known antenna pattern of the handheld reader.

14. The system according to claim 9, wherein the first signals are sent from the RF enabled devices at different times or frequencies.

15. The system according to claim 9, wherein the computing device further determines a location of at least one RFID tag within the facility relative to the location of the handheld reader which was previously determined.

16. A method for determining a location of a handheld reader within a facility, comprising: performing first operations by the handheld reader to read Radio Frequency Identifier ("RFID") tags having locations within the facility that are unknown to the handheld reader; performing second operations by the handheld reader to receive first signals from a plurality of stationary Radio Frequency ("RF") enabled devices located at known locations within the facility; and determining at least one of an orientation of the handheld reader and a location of the handheld reader within the facility using a combination of at least two of (1) known locations of the RF enabled devices associated with Received Signal Strength Indicator ("RSSI") levels, (2) known locations of the RF enabled devices associated with the TOF values, and (3) information indicating which RFID tags were read by the handheld reader and at least one of the RF enabled devices; generating a multi-dimensional map showing the location of the handheld reader within the facility and the orientation of the handheld reader; wherein the first and second operations are performed while the handheld reader is being carried by a person throughout the facility.

* * * * *